United States Patent [19]

Richards et al.

[11] Patent Number: 4,542,801
[45] Date of Patent: Sep. 24, 1985

[54] VEHICLE TRANSFER GEAR MECHANISM

[75] Inventors: David L. Richards, Bartonville; Willis E. Windish, Pekin, both of Ill.

[73] Assignee: Caterpillar Tractor Co., Peoria, Ill.

[21] Appl. No.: 624,500

[22] PCT Filed: Dec. 4, 1981

[86] PCT No.: PCT/US81/01623

§ 371 Date: Dec. 4, 1981

§ 102(e) Date: Dec. 4, 1981

[87] PCT Pub. No.: WO83/01928

PCT Pub. Date: Jun. 9, 1983

[51] Int. Cl.[4] .................. B60K 17/28; B60K 17/34
[52] U.S. Cl. .................... 180/53.1; 180/235; 74/15.86
[58] Field of Search ............. 180/53.1, 53.4, 53.8, 180/235, 247, 248, 250; 74/15.63, 15.66, 15.86

[56] References Cited

U.S. PATENT DOCUMENTS

| | | |
|---|---|---|
| 2,513,333 | 4/1946 | Keese et al. .................. 74/15.84 |
| 2,784,710 | 7/1953 | Kremser .................. 123/195 A |
| 2,867,126 | 8/1956 | Bolster .................. 74/360 |
| 2,932,202 | 12/1957 | Rinkema .................. 74/15.86 |
| 3,046,813 | 7/1962 | Bixby .................. 74/15.86 X |
| 3,334,703 | 8/1967 | Zeller .................. 180/247 X |
| 3,572,457 | 3/1971 | Hill .................. 180/235 X |
| 3,774,460 | 6/1972 | Browning et al. .................. 74/15.84 |
| 3,894,603 | 7/1975 | Winzeler .................. 180/53.1 |
| 3,982,599 | 2/1975 | Herscovici et al. .................. 180/53.1 |

Primary Examiner—John A. Pekar
Attorney, Agent, or Firm—Charles E. Lanchantin, Jr.

[57] ABSTRACT

A transfer gear mechanism (24) for a four-wheel drive tractor (10) or the like includes a depending gear transfer train (28) that has an input gear (34) on an upper axis (36) and an output gear (38) on a lower axis (40). Housing means (26) are provided for supporting the gear transfer train (28), a pump (196) along the upper axis (36), and a PTO clutch assembly (52) along a third axis (54) between the upper and lower axes (b 36,40) such that the PTO clutch assembly (52) is disposed underneath the pump (196) at an effective location. A service brake assembly (44) is also disposed on the lower axis (40) and it, the pump (196), and the PTO clutch assembly (52) can be individually serviced.

22 Claims, 3 Drawing Figures

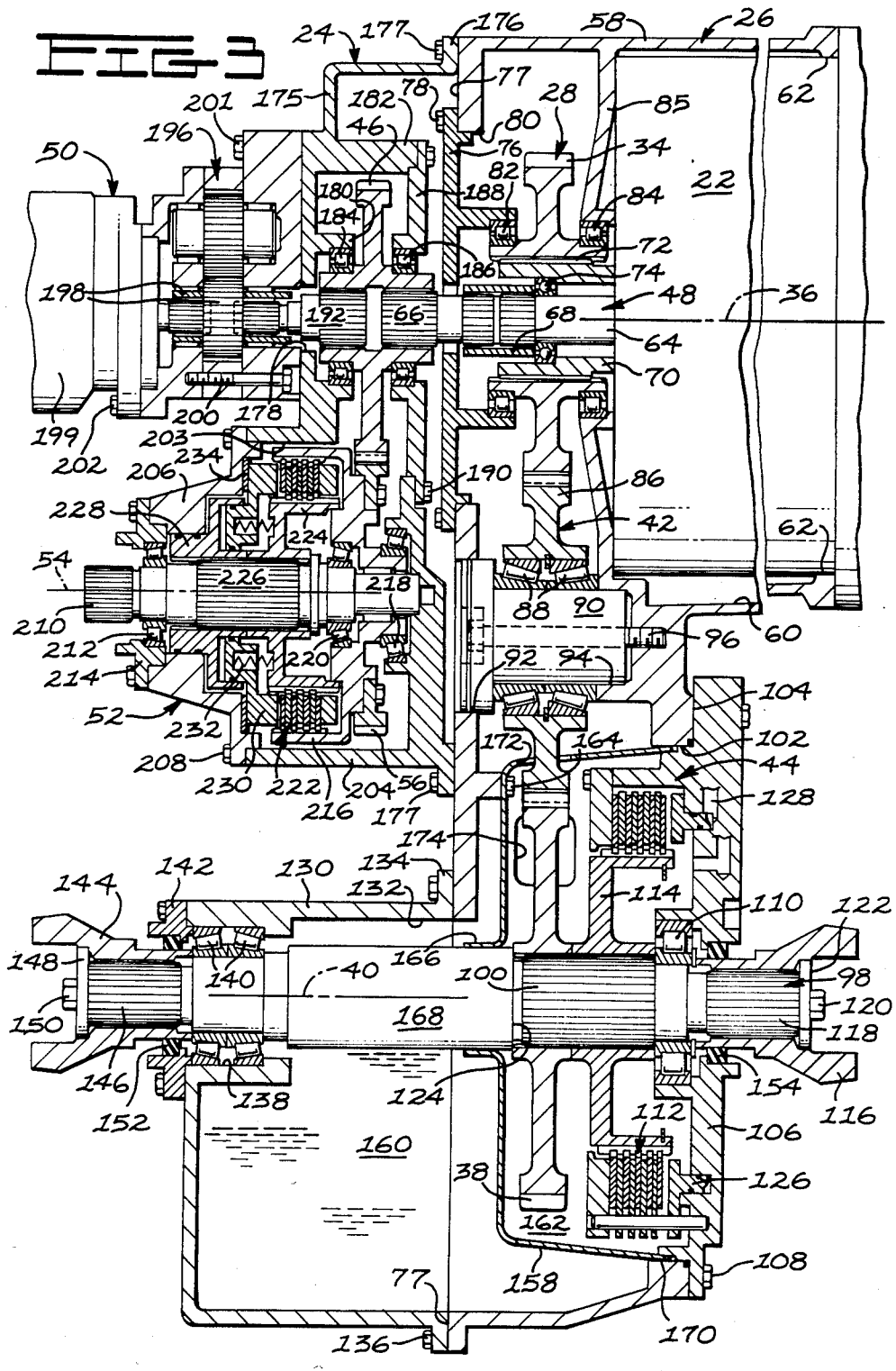

VEHICLE TRANSFER GEAR MECHANISM

DESCRIPTION

1. Technical Field

This invention relates generally to a vehicle transfer gear mechanism, and more particularly to a depending gear train and a power take-off clutch mechanism supported within a common housing or drop box.

2. Background Art

Articulated vehicles, such as four-wheel drive tractors, typically have an engine and at least a portion of a multi-speed transmission disposed on a front frame structure at a considerable elevation above the axes of the wheels. Hence, a depending gear transfer train is required to provide a drive to the wheels. Unfortunately, such a transfer train is often located on the rear frame structure. With this arrangement the drive to the front and rear wheels must pass twice across the generally centrally disposed articulation joint, which adds undesirable complexity and cost.

If the depending gear transfer train is mounted on the front frame structure ahead of the articulation joint it becomes a major problem to incorporate it and the entire multi-speed transmission in the relatively limited space provided behind the engine while making the components easily serviceable.

Moreover, these vehicles should provide an effective power take-off option, hereinafter referred to as PTO, for powerably operating implements at the rear thereof. Usually an engine driven PTO is desired so that its rotational speed is independent of the speed ratio of the multi-speed transmission. Preferably, the PTO should include a disengaging clutch assembly and the output shaft therefrom should pass above the axis of the rear axle at an elevation below that of the engine driven member. These requirements restrict the design options.

Still further, it is desirable to provide a service brake assembly in the drive line to the wheels and an auxiliary drive for powering certain hydraulic devices such as oil and implement pumps on the vehicle.

Thus, what is desired is a transfer gear mechanism having a housing or drop box which is longitudinally compact, and which is constructed for effective interconnection with a multi-speed transmission and an engine driven member. The construction of the transfer gear mechanism should be such as to allow convenient individual servicing and/or repair of the major components housed therein and including the PTO clutch assembly, the service brake assembly, and the auxiliary hydraulic drive without the need to remove the main housing.

The present invention is directed to overcoming one or more of the problems as set forth above.

DISCLOSURE OF THE INVENTION

In one aspect of the present invention a transfer gear mechanism for a vehicle has a depending gear transfer train having an input gear disposed on an upper axis and an output gear disposed on a lower axis, and housing means are provided for compactly supporting the gear transfer train, a pump and a PTO clutch assembly in preselected locations. Particularly, the housing means locates the pump along the upper axis and the PTO clutch assembly along a third axis elevationally between the upper and lower axes such that the PTO clutch assembly is disposed substantially underneath the pump.

In accordance with another aspect of the invention a depending gear transfer train for propelling a vehicle is supported within a housing such that an input gear thereof is disposed on an upper axis and an output gear thereof is disposed on a lower axis. A PTO input gear and a pump are connected to the housing, drive means are provided for powerably rotating them both, and a PTO clutch assembly driven by the PTO input gear is supported within the housing on a third axis intermediate the upper and lower axes such that it is disposed substantially underneath the pump.

In accordance with a still further aspect of the invention, a vehicle transfer gear mechanism includes a depending gear transfer train having an upper input gear and a lower output gear, a service brake assembly, and a PTO clutch assembly. These are all contained and supported within housing means such that the service brake assembly is in alignment with the lower axis of the output gear and the PTO clutch assembly is disposed elevationally between the input and output gears. Preferably, the PTO clutch assembly and service brake assembly are located respectively on the rear and front portions of the housing means to facilitate convenient individual servicing thereof.

BRIEF DESCRIPTION OF THE DRAWINGS

FIG. 3 is a diagrammatic, and centrally sectionalized side elevational view of the transfer gear mechanism illustrated in FIGS. 1 and 2 illustrating certain details of construction thereof.

BEST MODE FOR CARRYING OUT THE INVENTION

Figure 1:
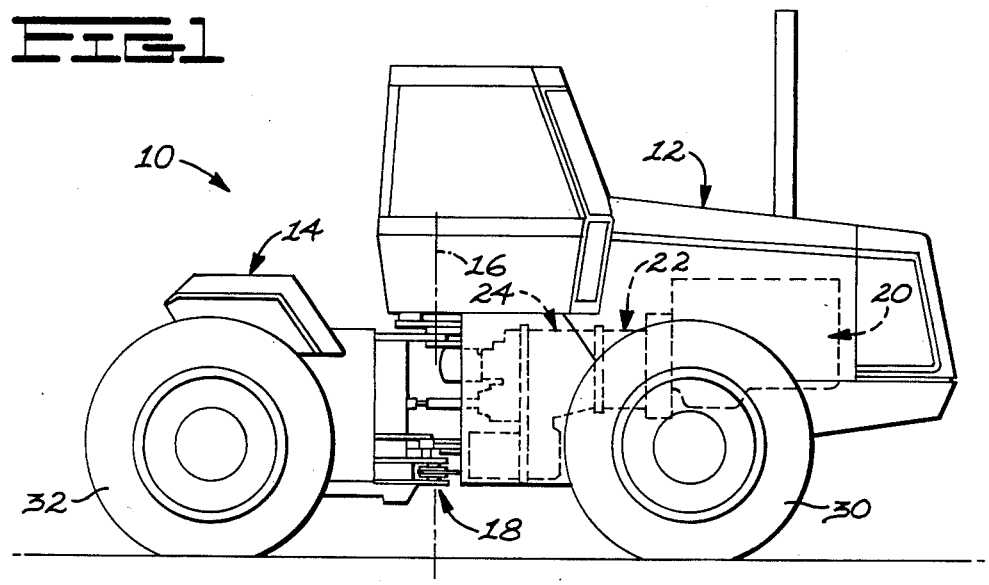
FIG. 1 is a diagrammatic, side elevational view of an articulated wheel-type vehicle showing the arrangement of a portion of the power train thereof, and including an embodiment of the transfer gear mechanism of the present invention, in broken lines.

Referring initially to FIG. 1, a four-wheeled drive vehicle 10 particularly adaptable to agricultural use is illustrated, which vehicle has a front section 12 and a rear section 14 secured together about a vertical axis 16 of articulation as provided by a conventional coupling 18. An engine 20, and a multi-speed transmission 22 of generally cylindrical shape are mounted on the front section of the vehicle, and the transmission extends generally longitudinally and rearwardly into a transfer gear mechanism or drop box 24 constructed in accordance with the present invention. Advantageously, the transfer gear mechanism is mounted at the rear of the front section adjacent the articulation axis so that the rear surface thereof can be conveniently serviced.

Figure 2:
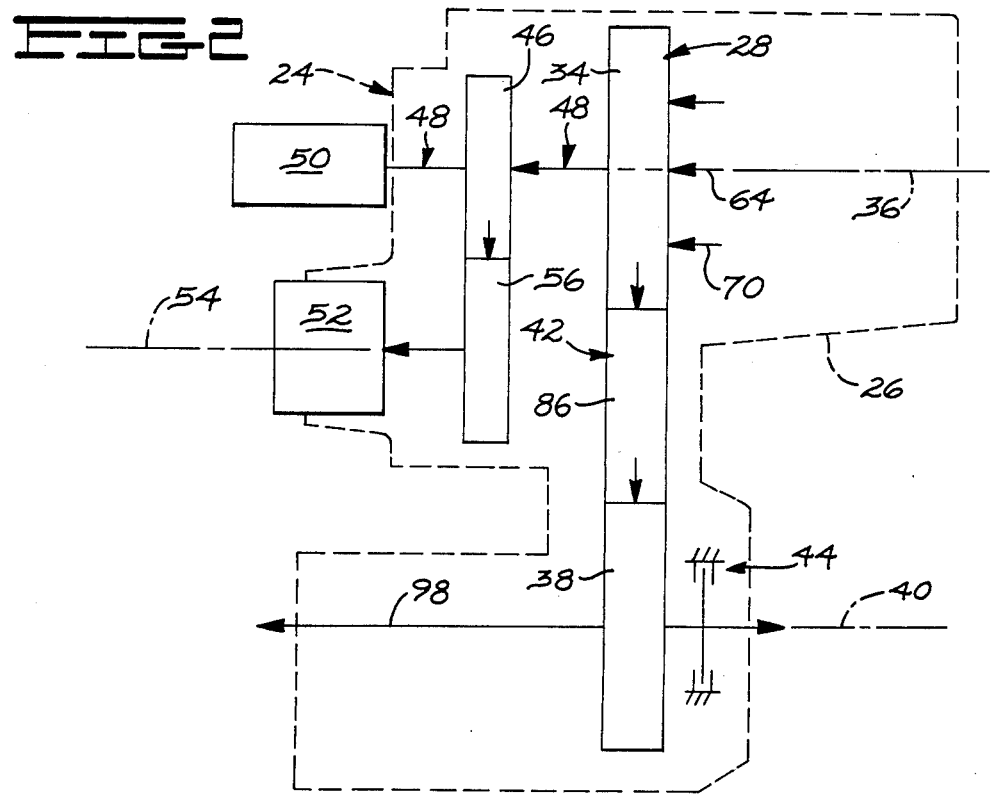
FIG. 2 is a schematic, side elevational representation of the major elements of the transfer gear mechanism of FIG. 1 at an increased scale and showing the normal power flow therethrough.

As is schematically illustrated in FIG. 2, the transfer gear mechanism 24 includes a drop box housing 26 as shown in broken lines and a depending gear transfer train 28 supported within the housing for powerably rotating front wheels 30 and rear wheels 32 of the vehicle. The gear transfer train has an input gear 34 disposed on an upper longitudinally extending axis 36, an output gear 38 disposed on a lower longitudinally extending axis 40, and gear means 42 connecting and transferring power between the input and output gears. Advantageously, a service brake assembly 44 is contained and supported within the housing 26 at the front face thereof and in concentric alignment with the lower axis 40.

The transfer gear mechanism 24 further includes a second input gear 46 rotatably supported within the housing 26 on the upper axis 36 and coupled to rotate with auxiliary drive means 48. In the instant embodiment the auxiliary drive means desirably and effectively powers certain hydraulic devices or pumps 50 as a function of engine speed as will be discussed later. A PTO clutch assembly 52 is featured which is generally contained and supported within the housing at the rear face thereof. The PTO clutch assembly is disposed on a third or central axis 54 located elevationally between the upper and lower axes 36,40. Preferably, as in the instant example, the central axis is disposed in a common vertical and longitudinally oriented plane with the upper and lower axes. The PTO clutch assembly is powered by another gear 56 which is in continuous intermeshing engagement with the second input gear 46.

More particularly, as shown best in FIG. 3, the housing 26 of the transfer gear mechanism 24 can be seen to include a main case 58 which is supported on the front section of the vehicle in a conventional manner. The main case defines a forwardly facing opening 60 and one or more cylindrical pilot surfaces such as is indicated by the reference number 62 for at least partly receiving and guidably supporting the rear part of the multi-speed transmission 22. The auxiliary drive means 48 extends rearwardly along the axis 36 from within the transmission and includes an input shaft 64 connected to the engine 20 for continuous rotation at engine speed. A coupling shaft 66 is releasably connected to the distal end of the input shaft 64 as by a sleeve coupling 68. In this way the coupling shaft 66 serves to drive the second input gear 46 at engine speed also.

A second tubular input shaft 70 serves as the output of the transmission 22 and is selectively driven through a range of speeds, in either direction of rotation. The tubular input shaft 70 is connected to the input gear 34 by a sliding spline connection 72, and a ball bearing 74 serves to rotatably support the input shaft 64 concentrically therewithin. An annular access and support plate 76 is releasably connected to a rear face 77 of the main case 58 by a plurality of fasteners 78 peripherally spaced around a cylindrical access opening 80 defined in the main case. A roller bearing 82 is mounted between the support plate and rear portion of the input gear 34, and another roller bearing 84 is mounted between the front portion of the input gear and a supporting wall 85 forming an integral part of the main case 58.

In the instant example, gear means 42 includes a single gear 86 mounted on an opposed pair of tapered roller bearings 88. A stepped cylindrical bearing element 90 extends forwardly through an opening 92 defined in the rear face 77 of the main case 58 and into engagement with a rearwardly facing blind bore 94 also defined in the main case. The bearing element 90 is releasably connected to the main case by a threaded fastener 96 and the tapered roller bearings are mounted thereon for rotatably supporting the gear 86.

The output gear 38 is releasably connected to a stepped output shaft 98 by splines 100 and, in essence, the front end of the output shaft is indirectly supported by the service brake assembly 44. More specifically, a cylindrical opening 102 concentric with the lower axis 40 is defined in the main case 58 at a front face 104, and a flanged brake body 106 pilotably extends rearwardly through the opening. The brake body 106 is releasably connected to the front face of the case by a plurality of peripherally spaced and threaded fasteners 108 and serves to support a roller bearing 110. In turn, the roller bearing 110 supports the front end of the output shaft 98.

In addition to the brake body 106, the service brake assembly 44 includes a plurality of annular plates and/or discs identified generally by the reference numeral 112 which are alternately connected to the brake body and to an output hub 114. The output hub is connected for joint rotation with the output shaft 98 via the splines 100, and a front output connecting flange 116 is releasably connected to the output shaft by splines 118. The output gear 38, the hub 114, the inner race of the roller bearing 110, and the connecting flange 116 are serially disposed such that screwthreaded insertion of an end fastener 120 into the front end of the output shaft and against a retaining plate 122 will urge these components axially to the left when viewing the drawing against a shaft shoulder 124.

The service brake assembly 44 further includes an annular piston 126 which is selectively urged to the left when viewing FIG. 3 via hydraulic pressure communicated thereto by way of a passage 128. When the piston moves to the left it will clamp the plates and discs 112 together as a unit to stop rotation of the hub 114 and output shaft 98 relative to the main case 58. The piston is automatically retracted or moved back to the right in a conventional manner by a plurality of compression springs mounted on the brake body, not shown.

A releasable sump casing 130 defines a forwardly facing opening 132 and an annular mounting flange 134. The flange is releasably connected to the rear face 77 of the main case 58 by a plurality of peripherally spaced fasteners 136. A rearwardly located stepped opening 138 is defined in the sump casing concentrically along the axis 40, and the output shaft 98 extends rearwardly through the stepped opening. An opposed pair of tapered roller bearings 140 are releasably secured in place within the stepped opening by an annular retainer 142 so that the rear portion of the output shaft is rotatably supported by the sump casing.

A rear output flange 144 is releasably connected to the output shaft 98 via a rear spline 146, and a retaining plate 148 and a fastener 150 releasably secure it in place on the shaft. A pair of seals 152,154 are mounted radially between the rear and front flanges 144,116, and the retainer 142 and brake body 106 respectively, to generally contain a lubricating fluid within the transfer gear mechanism 24. In this regard an annular baffle 158 is advantageously utilized during running operation of the vehicle to divide the bottom of the transfer gear mechanism into a relatively full sump chamber 160 and a relatively empty brake chamber 162. This baffle is preferably of formed sheet material and is releasably secured to the main case 58 by a plurality of fasteners 164. The baffle defines a generally cylindrical, rearwardly projecting sleeve 166 at the radially inward rear portion thereof which closely conforms to the diameter of a cylindrical surface 168 defined on the output shaft 98. Such close radially conformability limits or restricts the direct transfer of lubricating fluid from the sump chamber to the brake chamber in the region external of the cylindrical surface 168. An annular front lip 170 of the baffle is entrapped between the cylindrical opening 102 of the main case and the brake body 106 to similarly limit the transfer of fluid into the brake chamber at the front end thereof. The baffle further defines an upper gear access opening 172, and a pair of oppositely disposed fluid egress openings 174 so that rotation of the output gear 38 in either direction will cause lubricating fluid to be urged upwardly within the circumscribing baffle and radially outwardly through one of the egress openings into the sump chamber 160. When the vehicle is travelling the fluid level in the brake chamber 162 can be expected to be near the bottom of the output gear 38 and the fluid level in the sump chamber 160 can be expected to be near the bottom of the output shaft 98. Thus, means are provided for reducing the amount of lubricating fluid in the brake chamber 162 by returning it to the sump chamber 160 in order to reduce fluid drag losses caused by rotation of the output gear 38 and output hub 114.

Turning now to the hydraulic devices or pumps 50 located along the upper axis 36, it can be appreciated that a secondary or auxiliary case 175 supports them. Specifically, the secondary case 175 has a mounting flange 176 secured to the rear face 77 of the main case 58 by a plurality of fasteners 177. The secondary case defines a cylindrical opening 178 and first and second, axially oriented mounting walls 180,182 along the upper axis. A first roller bearing 184 is connected between the first mounting wall and the rear portion of the second input gear 46, and a second roller bearing 186 is connected between a releasable cover plate 188 and the front portion of the second input gear. The cover plate is releasably connected to the second mounting wall via fasteners 190.

The auxiliary drive means 48 includes an auxiliary drive shaft 192 which is releasably coupled to the second input gear 46 as by internal splines or the like within the gear. The auxiliary drive shaft 192 extends rearwardly to releasably drive a conventional transmission oil gear pump 196 via another tubular connector and integral pump gear 198. It also drives a variable rate implement pump 199, serially and releasably connected to the rear face of the transmission oil gear pump, through the tubular connector 198. The gear pump 196 is of conventional sandwich construction held together by a plurality of fasteners 200, and is releasably secured to the secondary case 175 as a unit by a plurality of fasteners 201. Another plurality of fasteners 202 serially and releasably connect the implement pump to the oil pump.

A rearwardly facing and generally cylindrical opening 203 is defined by an axially oriented annular wall 204 in the secondary case 175 for releasably receiving the PTO clutch assembly 52. The PTO clutch assembly includes a supporting body portion 206 which is releasably secured to the wall 204 by a plurality of fasteners 208. It also includes a PTO output shaft 210 rotatably supported at the rear by a tapered roller bearing 212 connected to a retainer 214 and with the retainer releasably connected to the body portion 206. The gear 56 serves as the input to the PTO clutch assembly and is connected to a hub 216 and, in turn, the hub is rotatably connected to the secondary case 175 by a tapered roller bearing 218. The front portion of the PTO output shaft 210 is supported within the hub by another tapered roller bearing 220.

The PTO clutch assembly 52 also includes a plurality of annular plates and/or discs 222 alternately connected externally to the hub and internally to a drum 224. The drum is connected to the PTO output shaft via splines 226, and a piston carrier member 228 is also connected to the shaft through the same splines. An annular piston 230 is telescopically received in the carrier member, such that it can be selectively moved to the right when viewing the drawing by hydraulic pressure or the like to engage the plates and effectively couple the hub to the drum for joint rotation. A plurality of springs 232 are connected between the drum and the piston to automatically urge it to the left toward disengagement. In the disengaged mode a low capacity brake plate 234 is in contact with the piston, and since the piston 230 is in splined engagement with the drum 224, the output shaft 210 is effectively lightly held in the stationary mode.

INDUSTRIAL APPLICABILITY

In operation, the input shaft 64 is continually driven at engine speed. Consequently both the second input gear 46 for driving the PTO clutch assembly 52 and the auxiliary drive shaft 192 for driving the pumps 50 are also driven at engine speed because they are releasably coupled to the input shaft through the sleeve coupling 68 and the coupling shaft 66. Should there be an operational problem in the implement pump 199, it can be removed rearwardly from the oil pump 196 for servicing by screwthreaded release of the fasteners 202. The pump gear and connector 198 is internally splined to allow convenient withdrawal of the implement pump therefrom. Alternatively, both pumps 196 and 199 can be rearwardly removed as a unit from the secondary case 175 for servicing by screwthreaded release of the fasteners 201. The pump gear and connector 198 can be released from the auxiliary drive shaft 192, and the auxiliary drive shaft separately taken out of the secondary case through the opening 178.

Assuming the second input gear 46 is being continually driven by the engine 20, then the gear 56 and intimately associated hub 216 are also driven at substantially the same speed. When the PTO clutch assembly piston 230 is retracted as illustrated in FIG. 3, there is no drive to the drum 224 and to the PTO output shaft 210. However, a light braking action is applied thereto since the piston is urged against the brake plate 234 and the piston is splined to the drum as stated earlier. With rightward movement of the piston away from the brake plate the alternate plates 222 are clamped together as a unit to directly couple the hub to the drum and to desirably rotate the PTO output shaft at engine speed.

Should the PTO clutch assembly 52 need servicing in the field, it is only necessary to screwthreadably release the fasteners 208. In that event separation of the PTO clutch assembly from within the secondary case 175 occurs at the tapered roller bearing 218. That is, the PTO output shaft 210, and all parts between and including the body portion 206 and the gear 56 can be removed as a modular unit. This removal is most easily achieved by angularly orienting the front and rear sections 12,14 of the vehicle 10 about the axis 16 as can be appreciated with reference to FIG. 1 to provide maximum access to the transfer gear mechanism 24 from one side of the vehicle.

Another feature of the transfer gear mechanism 10 is that the pumps 196,199, the gears 46,56, and the PTO clutch assembly 52 can be removed as a unit by simply screwthreadably releasing the fasteners 177 which hold the secondary case 175 to the main case 58. The sleeve coupling 68 can then be released rearwardly from within the cover plate 76 if desired. Moreover, the cover plate can be released from the main case by release of the fasteners 78, whereupon the input gear 34 can also be removed along with the radially inner part of the bearing 84. The engine driven shaft 64 and surrounding tubular input shaft 70 desirably remain in position since they are rotatably supported by the wall 85 of the main case and the transmission 22.

Turning now to the service brake assembly 44 illustrated in FIG. 3, it can be noted that the piston 126 is shown in the retracted or disengaged position. Hence, both the front and rear wheels 30,32 can be powerably driven by the rotation of the output shaft 98. Selective engagement of the transmission 22 in one of a plurality of gear speeds, in either direction of rotation, will powerably rotate the tubular input shaft 70 and connected input gear 34. The gears 86 and 38 subsequently rotate the output shaft 98 and the wheels to drive the vehicle. When vehicle braking is desired, the piston 128 is selectively and modulatably urged to the left when viewing the drawing against the load of the retraction springs, not shown. The plates are thereby clamped together such that the output hub 114 is frictionally connected to the brake body 106 and main case 58, thereby retarding rotation of the output shaft.

In order to remove the service brake assembly 44, the fasteners 108 are screwthreadably released from the main case 58. With the brake body 106 decoupled from the output shaft 98 the brake body, piston 126 and plates 122 can be moved, after the front output flange 116 is removed to the right away from the output hub 114, as a unit. Of course, the hub 114 can also be removed forwardly from the splines 100, as can the output gear 38 from the same splines.

Thus, the transfer gear mechanism 24 of the present invention is mounted on the front section of the vehicle and is coupled to a transmission 22 and engine driven shaft 64 in a longitudinally compact manner so as to make the major components easily serviceable. Advantageously, the PTO clutch assembly 52 can be pulled rearwardly as a unit from within the secondary case 175 of the housing 26 without affecting the pumps 196,199 and yet it is compactly disposed underneath the pumps at the desired intermediate elevation. Likewise, the service brake assembly 44 can be pulled forwardly as a unit from within the main case 58 of the housing without disturbing the PTO clutch assembly. At the same time the service brake assembly shares a common lubricating fluid and common sump chamber 160 with the PTO clutch assembly, for example.

Should a vehicle purchaser not originally want the PTO clutch assembly 52, the transfer gear mechanism 24 is constructed so as to allow convenient elimination thereof to effect a cost savings. Secondary case 175 and the second input gear 46 mounted therein would not then be needed, and the auxiliary drive shaft 192 of the gear pump 196 could be splinably connected directly to the sleeve coupling 68 and the gear pump suitably mounted on the main case 58. If the vehicle owner later wants to install the PTO clutch assembly 52 it is easy to add the necessary parts in the field.

Other aspects, objects and advantages of this invention can be obtained from a study of the drawings, the disclosure and the appended claims.

We claim:

1. In a transfer gear mechanism for a vehicle of the type having a depending gear transfer train for propelling the vehicle, the gear transfer train having an input gear disposed on an upper axis and an output gear disposed on a lower axis, the improvement comprising:
    a pump;
    a PTO clutch assembly; and
    housing means for supporting the gear transfer train, the pump, and the PTO clutch assembly, the pump being located along the upper axis, and the PTO clutch assembly being located along a third axis elevationally intermediate the upper and lower axes and substantially underneath the pump.

2. The transfer gear mechanism of claim 1 wherein the housing means includes a forwardly located main case and a rearwardly located secondary case, the gear transfer train being located in the main case, and the PTO clutch assembly being located in the secondary case.

3. The transfer gear mechanism of claim 1 including drive means for rotatably powering the pump and the PTO clutch assembly at about engine speed, the drive means including a member extending through the input gear along the upper axis.

4. (Amended) The transfer gear mechanism of claim 1 including first drive means for rotatably powering the pump and the PTO clutch assembly at about engine speed, and second drive means for rotatably powering the input gear through a full range of speeds.

5. The transfer gear mechanism of claim 1 wherein the upper, third and lower axes are located on a common vertically oriented plane.

6. The transfer gear mechanism of claim 1 wherein the PTO clutch assembly can be rearwardly withdrawn from within the housing means for servicing independent of the pump.

7. The transfer gear mechanism of claim 6 including a service brake assembly which can be forwardly withdrawn from within the housing means for servicing independent of the PTO clutch assembly.

8. The transfer gear mechanism of claim 1 including a service brake assembly supported within the housing means on the lower axis.

9. In a transfer gear mechanism for a vehicle of the type including a housing and a depending gear transfer train supported within the housing for propelling the vehicle, the gear transfer train having an input gear disposed on an upper axis and an output gear disposed on a lower axis, the improvement comprising:
    a PTO input gear supported within the housing on the upper axis;
    a pump connected to the housing on the upper axis;
    drive means for rotatably powering the PTO input gear and the pump; and
    a PTO clutch assembly supported within the housing on a third axis elevationally intermediate the upper and lower axes and disposed substantially underneath the pump, the PTO clutch assembly being driven by the PTO input gear.

10. The transfer gear mechanism of claim 9 wherein the housing includes a forward main case and a rearward secondary case, the gear transfer train being located in the main case, and the PTO clutch assembly being located in the secondary case.

11. The transfer gear mechanism of claim 10 wherein the housing includes a sump case releasably connected to the main case substantially underneath the PTO clutch assembly.

12. The transfer gear mechanism of claim 10 including a multi-speed transmission at least partially received in the main case.

13. The transfer gear mechanism of claim 10 including second drive means for rotatably powering the input gear through a range of transmission speeds, the second drive means being at least partially supported by the main case.

14. The transfer gear mechanism of claim 9 wherein the drive means includes an auxiliary drive shaft releasably connected between the PTO input gear and the pump.

15. The transfer gear mechanism of claim 14 wherein the drive means includes a coupling shaft releasably connected to the PTO input gear.

16. The transfer gear mechanism of claim 15 wherein the drive means includes an engine driven input shaft and a sleeve coupling releasably connected to the engine driven input shaft and to the coupling shaft.

17. The transfer gear mechanism of claim 9 wherein both the PTO clutch assembly and the pump can be rearwardly and independently disconnected from the housing for servicing.

18. In a transfer gear mechanism for a vehicle of the type having a depending gear transfer train for propelling the vehicle, the gear transfer train having an input gear disposed on an upper axis and an output gear disposed on a lower axis, the improvement comprising:
   a service brake assembly operatively connected to the gear transfer train;
   a pump;
   a PTO clutch assembly; and
   drive means for rotatably powering the pump and the PTO clutch assembly; and
   housing means for containing and supporting the gear transfer train, the pump, the service brake assembly in axial alignment with the lower axis, and the PTO clutch assembly at an elevation intermediate the upper axis and the lower axis, and wherein the sevice brake assembly is adapted to be released in a first direction from the housing means, and the pump and the PTO clutch assembly are adapted to be released in a direction opposite to the first direction from the housing means for individual servicing.

19. The transfer gear mechanism of claim 18 wherein the housing means includes a main case and an auxiliary case connected thereto, the main case containing the service brake assembly and the auxiliary case containing the PTO clutch assembly.

20. The transfer gear mechanism of claim 18 wherein the drive means includes a PTO input gear and an engine driven shaft located generally within the housing means, the engine driven shaft extending through the input gear of the gear transfer train and being drivingly connected to the PTO input gear, and the PTO input gear being connected to the PTO clutch assembly.

21. In a transfer gear mechanism for a vehicle of the type having a depending gear transfer train for propelling the vehicle, the gear transfer train having an input gear disposed on an upper axis and an output gear disposed on a lower axis, the improvement comprising:
   a service brake assembly;
   a PTO clutch assembly;
   housing means for containing and supporting the gear transfer train, the service brake assembly in axial alignment with the lower axis, and the PTO clutch assembly at an elevation intermediate the upper axis and the lower axis;
   a PTO input gear;
   an engine driven shaft located generally within the housing means, the engine driven shaft extending through the input gear of the gear transfer train and being drivingly connected to the PTO input gear, and the PTO input gear being connected to the PTO clutch assembly;
   a pump connected to the housing means; and
   an auxiliary drive shaft releasably connected to the pump and to the PTO input gear.

22. In a transfer gear mechanism for a vehicle of the type having a depending gear transfer train for propelling the vehicle, the gear transfer train having an input gear disposed on an upper axis and an output gear disposed on a lower axis, the improvement comprising:
   a service brake assembly;
   a PTO clutch assembly;
   housing means for containing and supporting the gear transfer train, the service brake assembly in axial alignment with the lower axis, and the PTO clutch assembly at an elevation intermediate the upper axis and the lower axis; and
   a pump releasably connected to the housing means along the upper axis, the pump being located above the PTO clutch assembly.

* * * * *